(12) United States Patent
Wu et al.

(10) Patent No.: US 8,511,920 B2
(45) Date of Patent: *Aug. 20, 2013

(54) FLEXIBLE TOUCH-TYPE KEYBOARD

(75) Inventors: Kun-Tsan Wu, Shindian (TW); Li-Wen Tien, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 217 days.

This patent is subject to a terminal disclaimer.

(21) Appl. No.: 12/949,958

(22) Filed: Nov. 19, 2010

(65) Prior Publication Data

US 2011/0305493 A1 Dec. 15, 2011

(30) Foreign Application Priority Data

Jun. 14, 2010 (CN) .......................... 2010 1 0201335

(51) Int. Cl.
*B41J 5/00* (2006.01)

(52) U.S. Cl.
USPC .......................... 400/491; 400/491.1; 341/22

(58) Field of Classification Search
USPC ........ 400/472, 489, 477, 491, 491.1; 341/22; 345/168–172; 160/23.1, 313, 318
See application file for complete search history.

(56) References Cited

U.S. PATENT DOCUMENTS

| | | | | | |
|---|---|---|---|---|---|
| 5,220,521 | A | * | 6/1993 | Kikinis | 708/138 |
| 5,595,449 | A | * | 1/1997 | Vitkin | 400/472 |
| 5,616,897 | A | * | 4/1997 | Weber et al. | 200/5 A |
| 6,265,993 | B1 | * | 7/2001 | Johnson | 341/22 |
| 6,313,762 | B1 | * | 11/2001 | Crowley et al. | 341/22 |
| 6,655,863 | B2 | * | 12/2003 | Lin | 400/491 |
| 6,867,712 | B2 | * | 3/2005 | Tai | 341/22 |
| 2002/0048083 | A1 | * | 4/2002 | Okumura | 359/461 |
| 2003/0048256 | A1 | * | 3/2003 | Salmon | 345/168 |
| 2008/0303782 | A1 | * | 12/2008 | Grant et al. | 345/156 |

* cited by examiner

*Primary Examiner* — Matthew G Marini
*Assistant Examiner* — Marissa Ferguson Samreth
(74) *Attorney, Agent, or Firm* — Altis Law Group, Inc.

(57) ABSTRACT

A flexible touch-type keyboard includes a flexible keyboard module, a receiving assembly for receiving the flexible keyboard module, and a cover. The receiving assembly is connected to one end of the flexible keyboard module; and the cover connected to the opposite end of the flexible keyboard module. The flexible keyboard module is withdrawn from the receiving assembly and automatically rolled back into the receiving assembly by pulling the cover away from the receiving assembly different distances.

15 Claims, 9 Drawing Sheets

FIG. 9

FLEXIBLE TOUCH-TYPE KEYBOARD

CROSS-REFERENCE TO RELATED APPLICATIONS

This application is related to co-pending U.S. patent application Ser. Nos. 12/944,851, and 12/944,855, filed Nov. 12, 2010.

BACKGROUND

1. Technical Field

The present disclosure generally relates to touch-type keyboards, and particularly to a flexible touch-type keyboard that can be rolled up for transport.

2. Description of Related Art

Mechanical keyboards and touch-type keyboards are widely used for device input. However, both mechanical and touch-type keyboards are inflexible and take up considerable space, being inconvenient to transport.

Therefore, there is a room for improvement within the art.

BRIEF DESCRIPTION OF THE DRAWINGS

Many aspects of the present flexible touch-type keyboard can be better understood with reference to the following drawings. The components in the drawings are not necessarily to scale, the emphasis instead being placed upon clearly illustrating the flexible touch-type keyboard. Moreover, in the drawings, like reference numerals designate corresponding parts throughout the several views.

DETAILED DESCRIPTION

Figure 1:
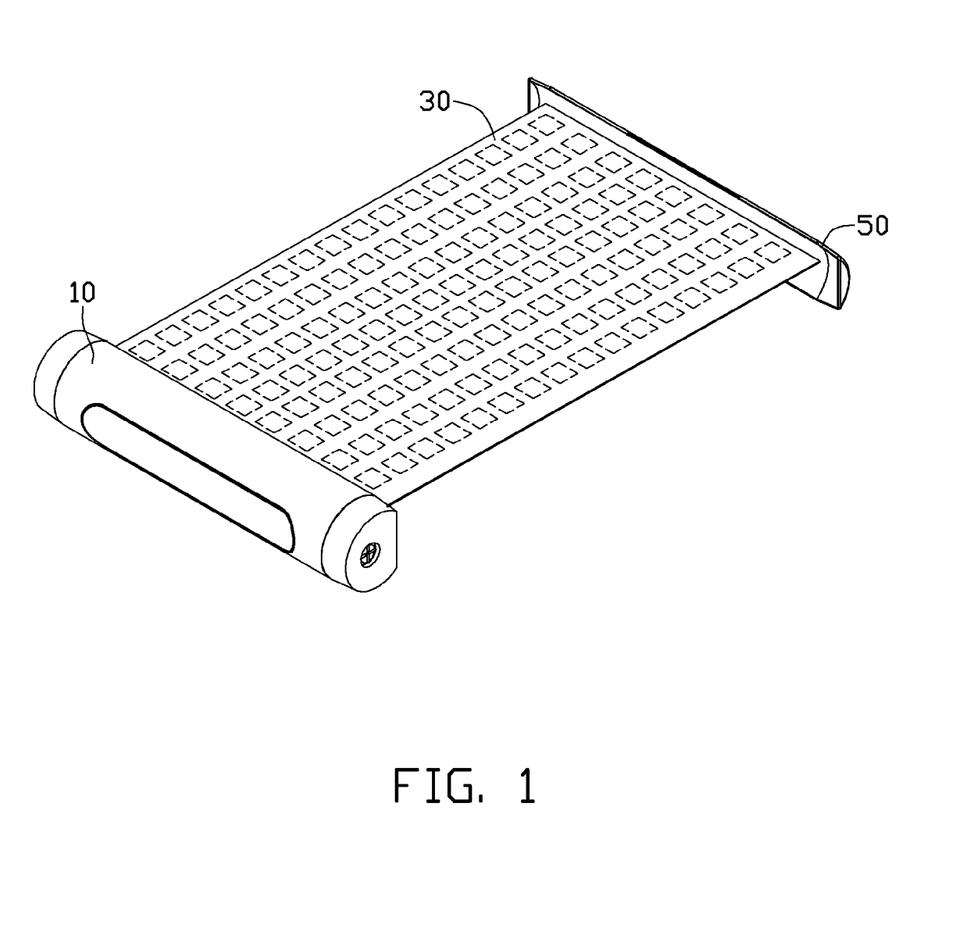
FIG. 1 is a schematic view of a flexible touch-type keyboard in an open state, according to an exemplary embodiment.

Referring to FIG. 1, the exemplary embodiment provides a flexible touch-type keyboard 100 including a receiving assembly 10, a flexible keyboard module 30 and a cover 50. One end of the flexible keyboard module 30 is connected to the receiving assembly 10, and the opposite end of the flexible keyboard module 30 is connected to the cover 50. The flexible keyboard module 30 can be rolled in the receiving assembly 10.

Figure 2:
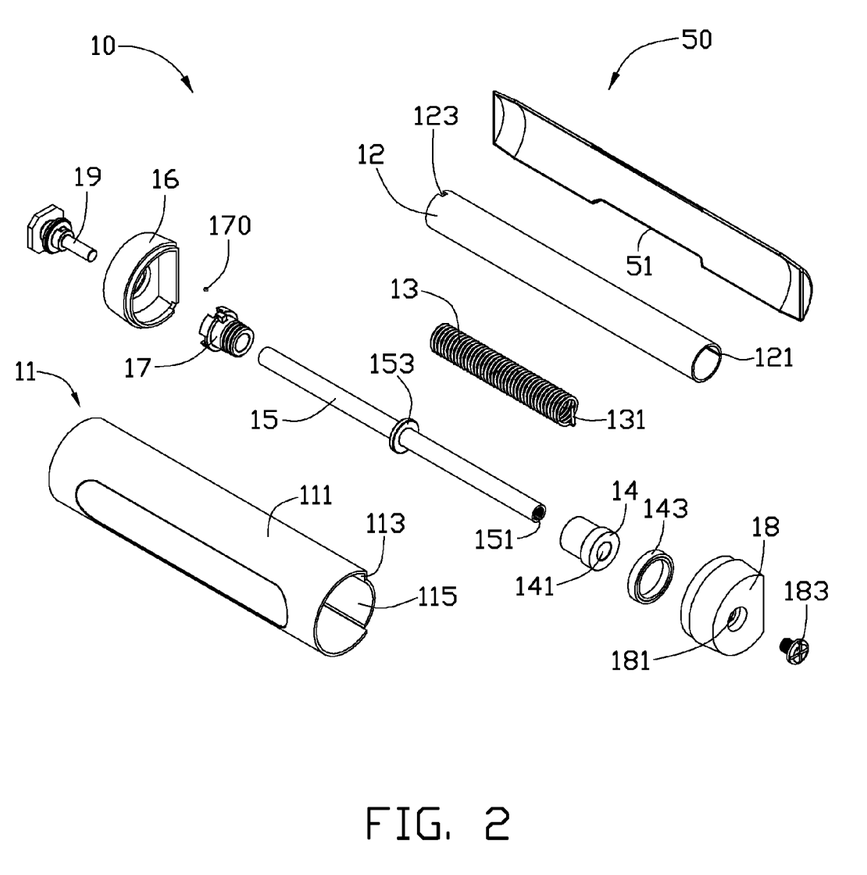
FIG. 2 is an exploded view of a receiving assembly and a cover shown in FIG. 1.
Figure 3:
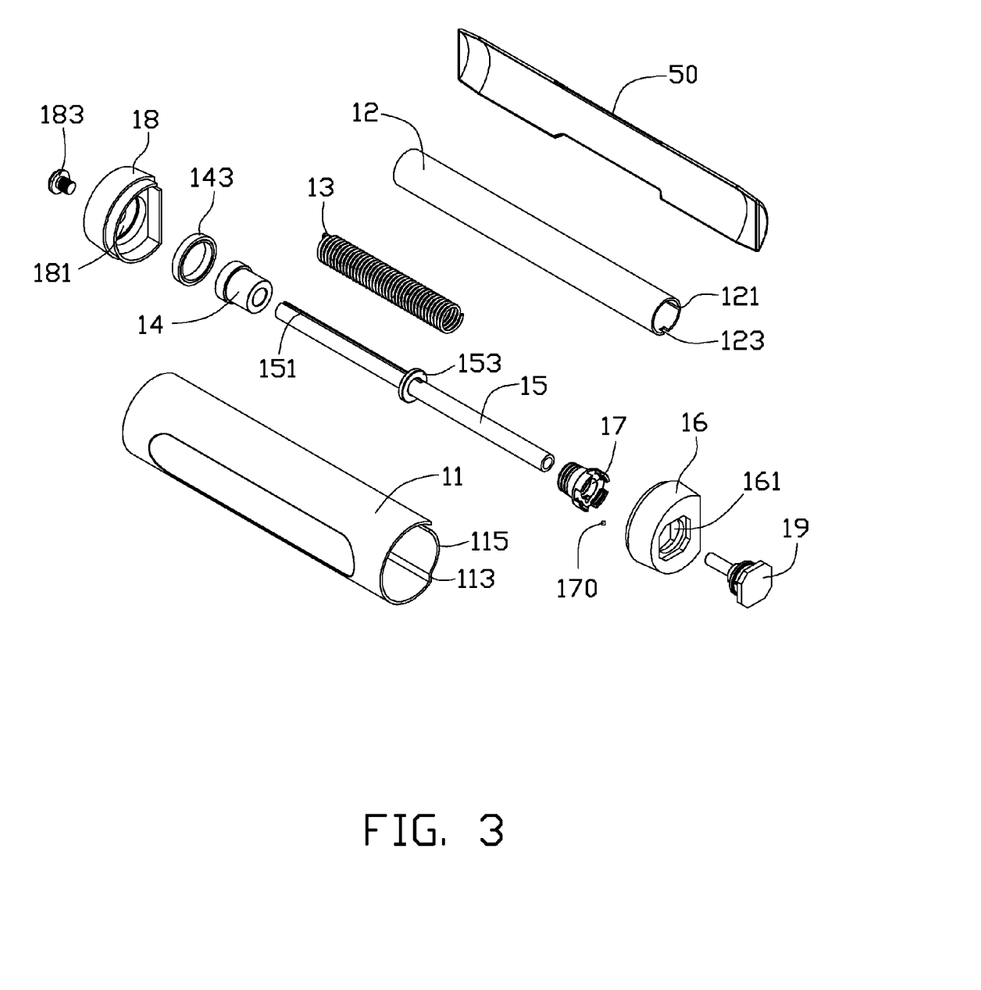
FIG. 3 is similar to FIG. 2, shown from another angle.

Referring to FIG. 2 and FIG. 3, the receiving assembly 10 includes a first sleeve 11, a second sleeve 12, a spring 13, a fastening member 14, a shaft 15, a first cap 16, a rotary member 17, a second cap 18, and an engagement member 19. The first sleeve 11 receives the flexible keyboard module 30 and the second sleeve 12. The spring 13 is coiled around the shaft 15. The fastening member 14 is located on one end of the shaft 15. The rotary member 17 is located on the opposite end of the shaft 15 and is securely connected with the spring 13. The spring 13, the fastening member 14, the shaft 15 and the rotary member 17 are received in the second sleeve 12. The first cap 16 is located on one end of the first sleeve 11, and the second cap 18 is located on the opposite end of the first sleeve 11 and is mounted to the fastening member 14. The engagement member 19 is received in the first cap 16 and engaged with the rotary member 17.

The first sleeve 11 includes a first curved portion 111, a connecting portion 113 and a second curved portion 115. The first curved portion 111 is connected to the second curved portion 115 through the connecting portion 113. A gap (not labeled) is formed between the first curved portion 111 and the second curved portion 115, and the gap acts as an entrance for the flexible keyboard module 30. Two openings 51 are defined on the cover 50, through which the cover 50 can be pulled.

A slot 121 is defined on the second sleeve 12. One end of the flexible keyboard module 30 is mounted to the second sleeve 12 through the slot 121. A notch 123 is defined on one end of the second sleeve 12.

The spring 13 includes a latch portion 131. The fastening member 14 defines a through hole 141. The shaft 15 is a cylindrical sleeve and defines a slit 151. The latch portion 131 is latched in the slit 151. A ring 153 is coiled around the shaft 15 and the ring 153 resists the latch portion 131. The length of the spring 13 may be adjusted through the slit 151 and the ring 153.

The first cap 16 defines a first stepped hole 161, and the second cap 18 defines a second stepped hole 181. The engagement member 19 is mounted in the first stepped hole 161. The fastening member 14 is mounted in the second stepped hole 181.

Figure 4:
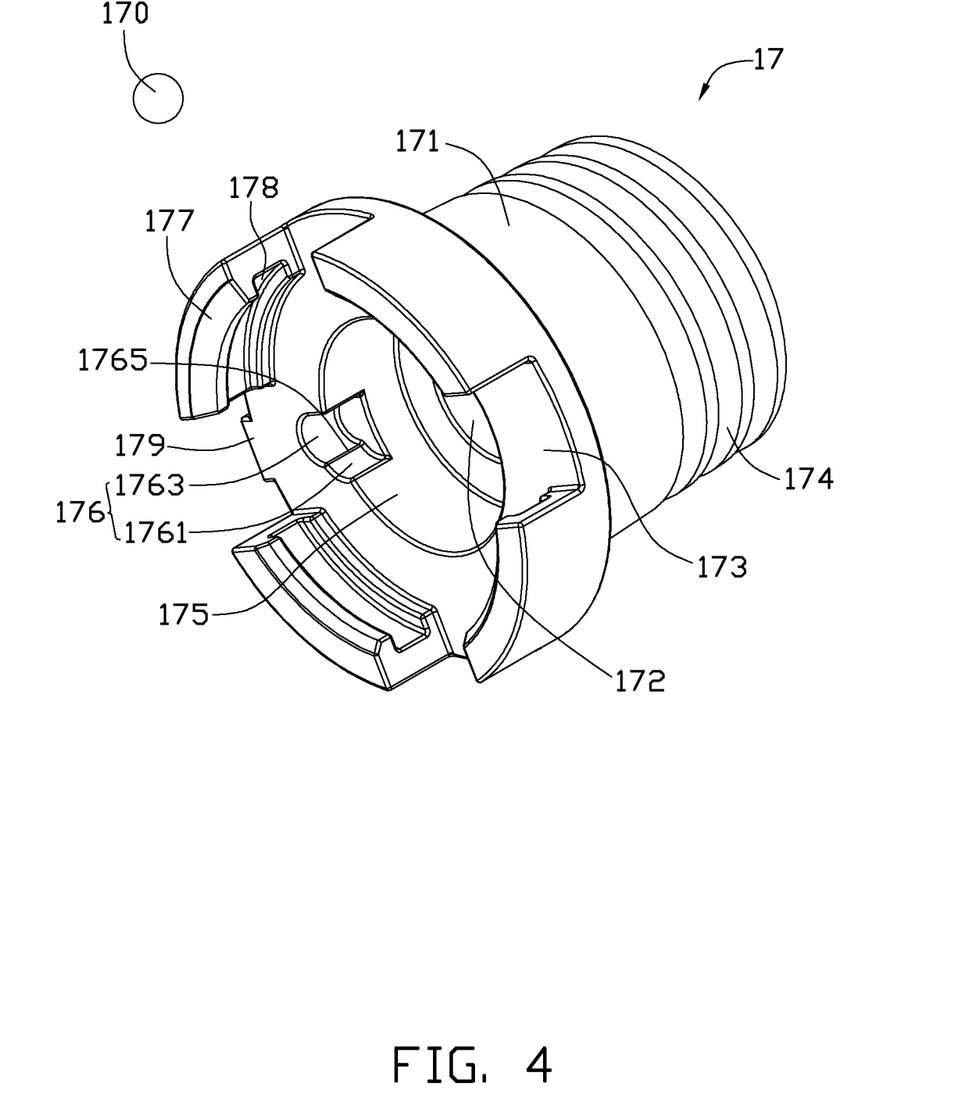
FIG. 4 is an enlarged view of a rotary member shown in FIG. 3.

Referring to FIG. 4, the rotary member 17 includes a ball 170, a first rotary portion 171 and a second rotary portion 173 extending from one end of the first rotary portion 171. The first rotary portion 171 defines a central hole 172. A threaded groove 174 is defined on the external wall of the first rotary portion 171. The threaded groove 174 corresponds to the end of the spring 13 away from the latch portion 131. The second rotary portion 173 defines an inner hole 175 and a receiving groove 176 in communication with the inner hole 175. The ball 170 is movably received in the receiving groove 176. The receiving groove 176 includes a first curved groove 1761 and a second curved groove 1763. The joint of the first curved groove 1761 and the second curved groove 1763 defines a boundary line 1765. Four curved protrusions 177 evenly spaced apart from each other are located on the second rotary portion 173. Each curved protrusion 177 defines a sliding slot 178. A latch block 179 extends from the external wall of the second rotary portion 173.

Figure 5:
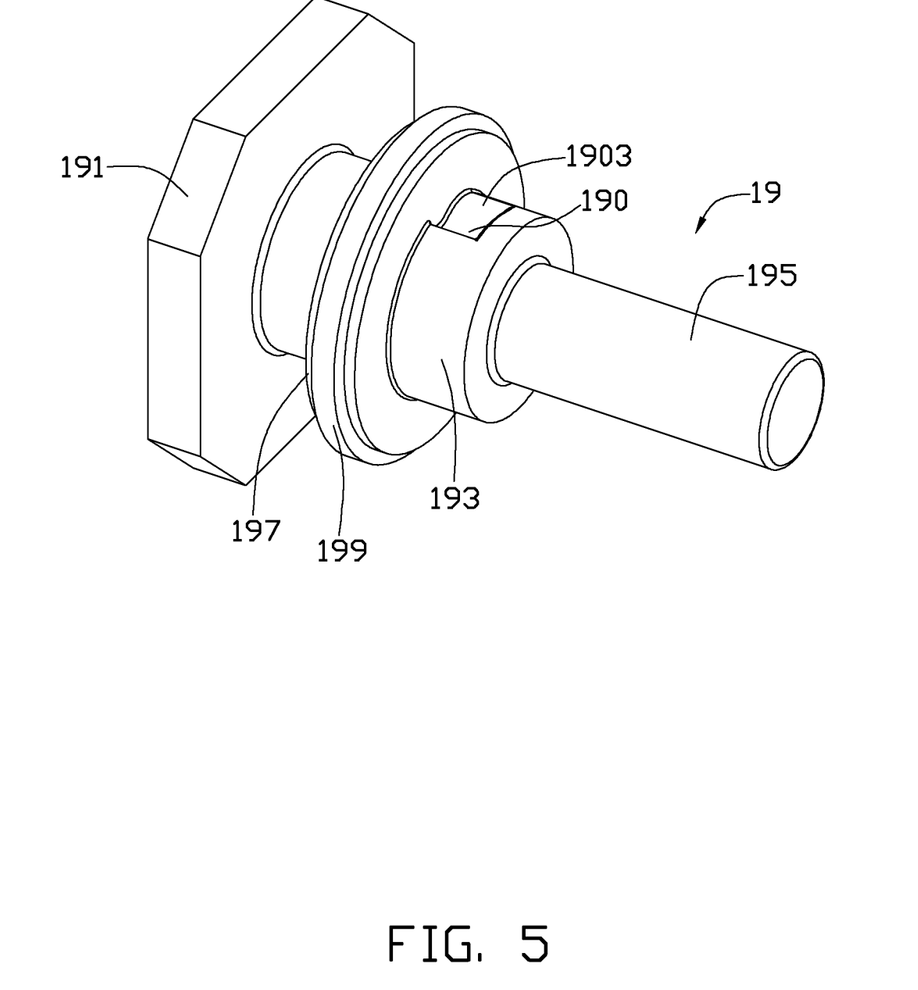
FIG. 5 is an enlarged view of an engagement member shown in FIG. 2.

Referring to FIG. 5, the engagement member 19 includes a flange portion 191, a first column 193, and a second column 195 connected to the first column 193. The first column 193 corresponds to the inner hole 175, and the second column 195 corresponds to the shaft 15. A ring flange 197 extends from the middle of the first column 193. A ring protrusion 199 is located around the ring flange 197. The ring protrusion 199 corresponds to the sliding slots 178. The first column 193 defines a recess 190 corresponding to the receiving groove 176. The recess 190 includes a curved transition surface 1903.

Figure 6:
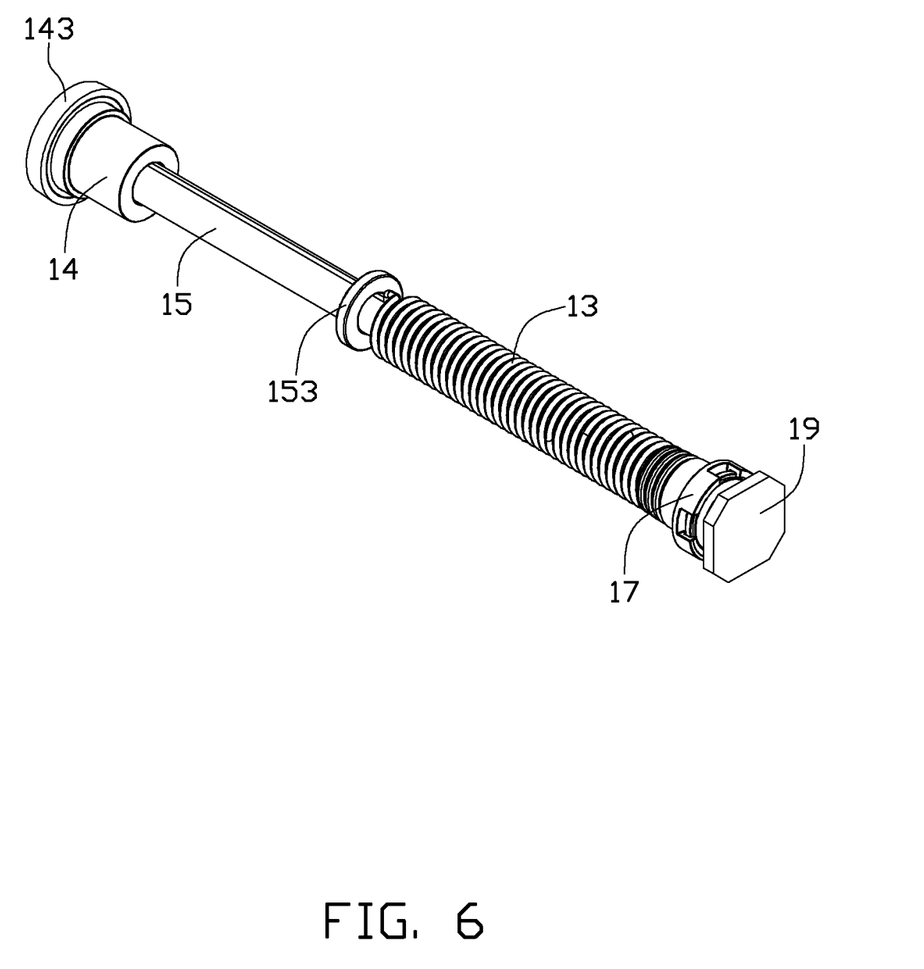
FIG. 6 is a schematic view of parts of the receiving assembly shown in FIG. 3.
Figure 7:
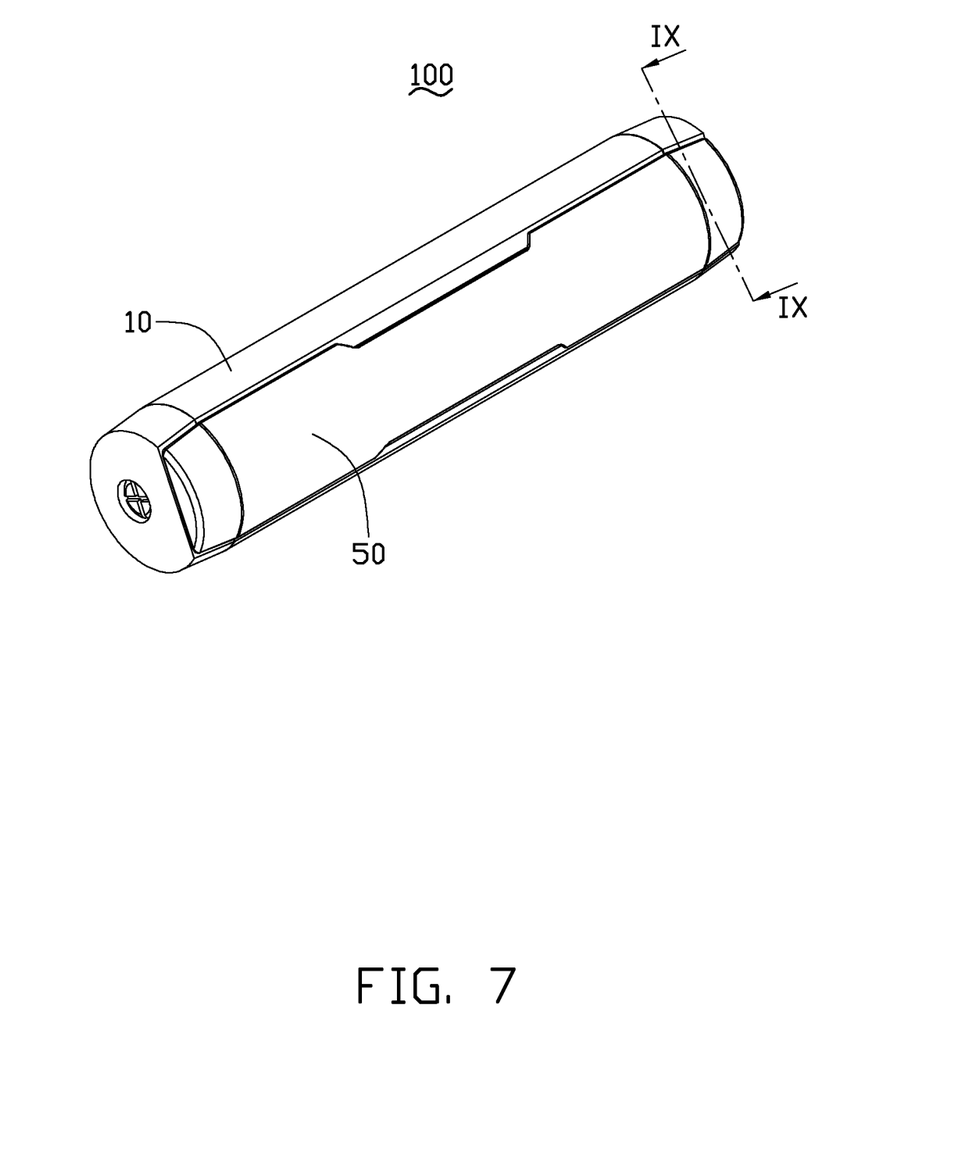
FIG. 7 is a schematic view of the flexible touch-type keyboard in a rolled state.

Referring to FIG. 6 and FIG. 7, the assembly process of the receiving assembly 10 may be as follows:

The end of the shaft 15 away from the slit 151 is received in the central hole 172. The spring 13 is coiled around the shaft 15, and the end of the spring 13 opposite to the latch portion 131 is received in the threaded groove 174. The latch portion 131 is latched in the slit 151. The ring 153 resists the latch portion 131. The shaft 15 and the spring 13 are received in the second sleeve 12, and the latch block 179 is latched in the notch 123. The end of the shaft 15 away from the spring 13 is received in the through hole 141. A latch loop 143 is coiled around the free end of the fastening member 14. The assembled parts are received in the first sleeve 11.

The first cap 16 is located on one end of the first sleeve 11. The flange portion 191 is latched in the first stepped hole 161. The first column 193 contacts the rotary member 17 through the first stepped hole 161. The ring protrusion 199 is received in the sliding slots 178. The second column 195 is received in the shaft 15. The latch loop 143 is latched in the second stepped hole 181. A fastener 183 is locked with the shaft 15 through the second stepped hole 181. The assembly process of the receiving assembly 10 is completed.

Figure 8:
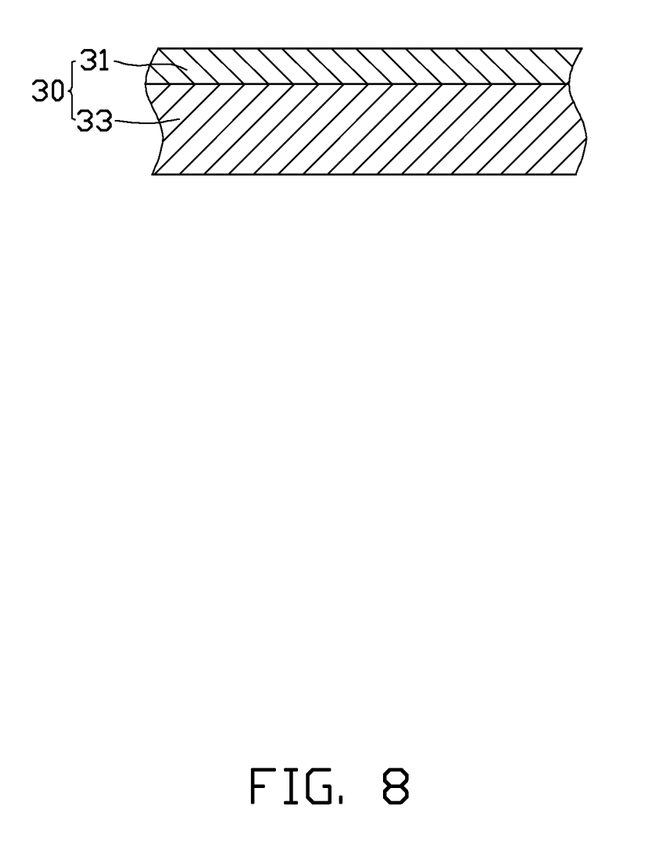
FIG. 8 is a cross section of a flexible keyboard module shown in FIG. 1.

Referring to FIG. 1 and FIG. 8, the flexible keyboard module 30 includes a touch layer 31 and a support layer 33. The touch layer 31 is located on the support layer 33. The touch layer 31 may be a flexible touch screen, and the support layer 33 may be a flexible substrate of resin. A plurality of key icons (not labeled) are located on the support layer 33. The key icons may be formed by printing or etching. An operation area (not labeled) of the flexible keyboard module 30 is composed of the key icons. The flexible keyboard module 30 is rolled on the second sleeve 12. One end of the flexible keyboard module 30 is mounted to the second sleeve 12 through the slot 121, and the opposite end of the flexible keyboard module 30 is secured to the cover 50 through the gap of the first sleeve 11.

Figure 9:
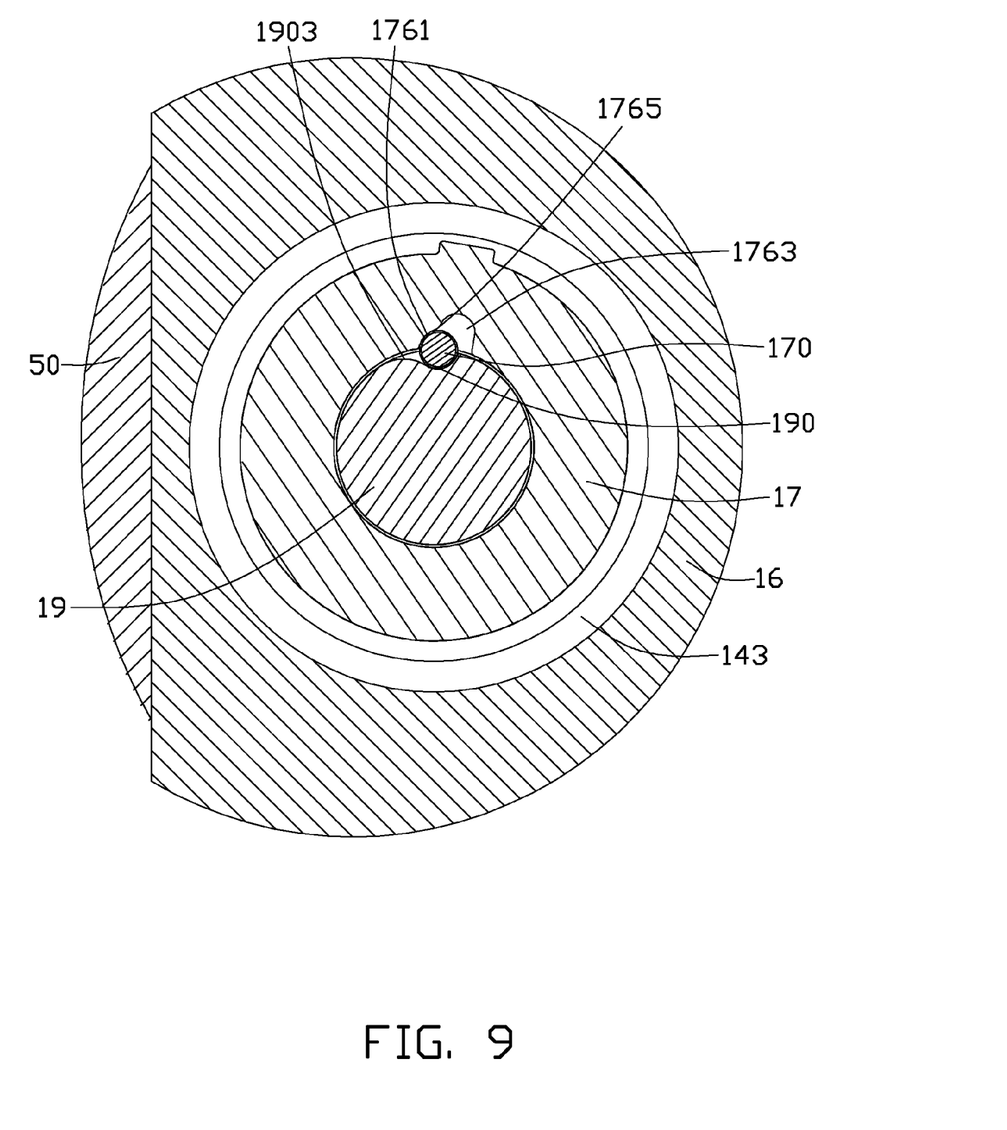
FIG. 9 is a cross section of the flexible touch-type keyboard of FIG. 7 taken along line IX-IX.

Referring to FIG. 7 and FIG. 9, deployment of the flexible touch-type keyboard 100 may be as follows:

The cover 50 is pulled to withdraw the flexible keyboard module 30. As a result of the friction between the flexible keyboard module 30 and the second sleeve 12, the second sleeve 12 and the rotary member 17 start to rotate. During unrolling of the flexible touch-type keyboard 100, the ball 170 is received in the second curved groove 1763 under the action of the centrifugal force. When the operation area of the flexible keyboard module 30 is completely exposed, the second curved groove 1763 is opposite to the recess 190. The ball 170 is located between the first curved groove 1761 and the recess 190 by gravity. Thus, there is no relative motion between the rotary member 17 and the engagement member 19, and the ball 170 prevents the flexible keyboard module 30 from returning into the receiving assembly 10, and the flexible keyboard module 30 is ready for use.

For stowage, the cover 50 is pulled away from the receiving assembly 10. The rotary member 17 starts to rotate, and the sidewall of the second curved groove 1763 pushes the ball 170 out of the recess 190 along the transition surface 1903. Again, the ball 170 is received in the second curved groove 1763. At this moment, the cover 50 may be released, and the flexible keyboard module 30 is automatically rolled back into the receiving assembly 10 under the recovery force of the spring 13.

The flexible touch-type keyboard 100 takes up minimal space and is convenient to transport.

In another exemplary embodiment, the support layer 33 can be a flexible display screen, such as an organic light emitting diode display screen, or a polymer light emitting diode display screen.

In another exemplary embodiment, the cover 50 may be omitted.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A flexible touch-type keyboard, comprising:
   a flexible keyboard module for inputting information comprising an operation area;
   a receiving assembly for receiving the flexible keyboard module, the receiving assembly connected to one end of the flexible keyboard module, and the receiving assembly comprising a shaft, a spring coiled around the shaft, a rotary member located on an end of the shaft and securely connected with the spring, and an engagement member rotatably engaging with the rotary member; and
   a cover connected to the opposite end of the flexible keyboard module;
   wherein the rotary member comprises a ball, a first rotary portion connected with the spring, and a second rotary portion extending from one end of the first rotary portion; the second rotary portion defines a receiving groove and the ball is movably received in the receiving groove; the receiving groove comprises a first curved groove and a second curved groove; the engagement member defines a recess comprising a transition surface; during unrolling of the flexible touch-type keyboard, the ball is received in the second curved groove under the action of the centrifugal force; when the operation area of the flexible keyboard module is completely exposed, the second curved groove is opposite to the recess and the ball is resisted between the first curved groove and the recess by gravity; the cover is further pulled away form the receiving assembly, sidewall of the second curved groove pushes the ball out of the recess along the transition surface.

2. The flexible touch-type keyboard as claimed in claim 1, wherein the receiving assembly includes a first sleeve, a second sleeve received in the first sleeve, a fastening member located on an opposite end of the shaft; the shaft, the fastening member and the rotary member are received in the second sleeve.

3. The flexible touch-type keyboard as claimed in claim 2, wherein the receiving assembly further includes a first cap located on one end of the first sleeve, a second cap located on the opposite end of the first sleeve; the engagement member is engaged with the first cap and the rotary member, and the second cap is mounted to the fastening member.

4. The flexible touch-type keyboard as claimed in claim 3, wherein the engagement member includes a first column and a second column connected with the shaft; the first column defines the recess corresponding to the receiving groove.

5. The flexible touch-type keyboard as claimed in claim 4, wherein when the operation area is completely exposed, stop pulling the cover, and the ball moves from the second curved groove to the first curved groove and the recess to prevent the flexible keyboard module from rolling back into the receiving assembly.

6. The flexible touch-type keyboard as claimed in claim 5, wherein when the operation area is completely exposed, keep on pulling the cover, the rotary member starts to rotate to make the ball slide out of the recess and slide into the second curved groove.

7. The flexible touch-type keyboard as claimed in claim 6, wherein a plurality of curved protrusions evenly spaced apart from each other are located on the second rotary portion, and each curved protrusion defines a sliding slot.

8. The flexible touch-type keyboard as claimed in claim 7, wherein a ring protrusion is located around the first column, and the ring protrusion is received in the sliding slots.

9. The flexible touch-type keyboard as claimed in claim 8, wherein the flexible keyboard module is rolled on the second sleeve, and the one end of the flexible keyboard module is mounted to the second sleeve; the first sleeve includes a gap, and the flexible keyboard module is secured to the cover through the gap.

10. The flexible touch-type keyboard as claimed in claim 9, wherein the flexible keyboard module includes a touch layer and support layer, the touch layer is located on the support layer.

11. The flexible touch-type keyboard as claimed in claim 10, wherein the support layer is a flexible display screen.

12. A flexible touch-type keyboard, comprising:
a flexible keyboard module for inputting information comprising an operation area, the flexible keyboard module including an end and an opposite end; and
a receiving assembly for receiving the flexible keyboard module, the receiving assembly connected to the end of the flexible keyboard module, and the receiving assembly comprising a shaft, a spring coiled around the shaft, a rotary member located on an end of the shaft and securely connected with the spring, and an engagement member rotatably engaging with the rotary member;
wherein the rotary member comprises a ball, a first rotary portion connected with the spring, and a second rotary portion extending from one end of the first rotary portion; the second rotary portion defines a receiving groove and the ball is movably received in the receiving groove; the receiving groove comprises a first curved groove and a second curved groove; the engagement member defines a recess comprising a transition surface; the opposite end of the flexible keyboard module is pulled to withdraw the flexible keyboard module, the ball is received in the second curved groove under the action of the centrifugal force; when the operation area of the flexible keyboard module is completely exposed, and the ball moves from the second curved groove to be resisted between the first curved groove and the recess to prevent the flexible keyboard module from rolling back into the receiving assembly.

13. The flexible touch-type keyboard as claimed in claim 12, wherein the receiving assembly includes a first sleeve, a second sleeve received in the first sleeve, a fastening member located on an opposite of the shaft; the shaft, the fastening member and the rotary member are received in the second sleeve.

14. The flexible touch-type keyboard as claimed in claim 13, wherein the receiving assembly further includes a first cap located on one end of the first sleeve, a second cap located on the opposite end of the first sleeve; the engagement member is engaged with the first cap and the rotary member, and the second cap is mounted to the fastening member.

15. The flexible touch-type keyboard as claimed in claim 14, wherein when the operation area is completely exposed, keep on pulling the flexible keyboard module, the rotary member starts to rotate to make the ball slide out of the recess and slide into the second curved groove.

\* \* \* \* \*